United States Patent Office 3,449,511
Patented June 10, 1969

3,449,511
POSITION MEASUREMENT EQUIPMENT FOR TELEVISION IMAGES
Klaus J. Hecker, Oberursel, Taunus, Germany, assignor to the United States of America as represented by the Secretary of the Navy
Filed Aug. 24, 1966, Ser. No. 574,826
Int. Cl. H04n 3/00
U.S. Cl. 178—6.8        4 Claims

ABSTRACT OF THE DISCLOSURE

A circuit for measuring the position of points on the face of a television picture tube by gating oscillations from an oscillator between two points on the television screen and having digital counters to count these oscillations for the horizontal and vertical deflections to accurately determine the horizontal and vertical distances on a television image and the relative position between the two points.

Statement of Government interest

The invention described herein may be manufactured and used by or for the Government of the United States of America for governmental purposes without the payment of any royalties thereon or therefor.

This invention relates to a system which accurately determines the horizontal and vertical distances, and the relative position, between two points of a television image.

Background and summary of the invention

One method of determining the distance between two points on a television image would be to detect the horizontal (H) and vertical (V) co-ordinate deflection voltages of the two points, and to compare these voltages in two differential amplifiers. One differential amplifier is for comparing the horizontal co-ordinates of both points, and the second differential amplifier is for comparing the vertical co-ordinates. The polarity and amplitude of the output signals of the differential amplifiers may then be analyzed to determine distance and relative position of the two signals. This method of distance determination is limited in accuracy, however, where there are very small differences between the positions of the two points. This limited accuracy is inherent in the system just described because it is an analog method. Therefore, it is a general object of this invention to provide a device which uses digital methods to accurately define the positions of two points on a television image. For purposes of this discussion the two points will be referred to as point "A" and point "B."

Brief description of the drawings

Other objects, advantages, uses and novel features of the invention will become apparent from the following detailed description of the invention when considered in conjunction with the accompanying drawings, in which.

Description of the preferred embodiment

Figure 1:
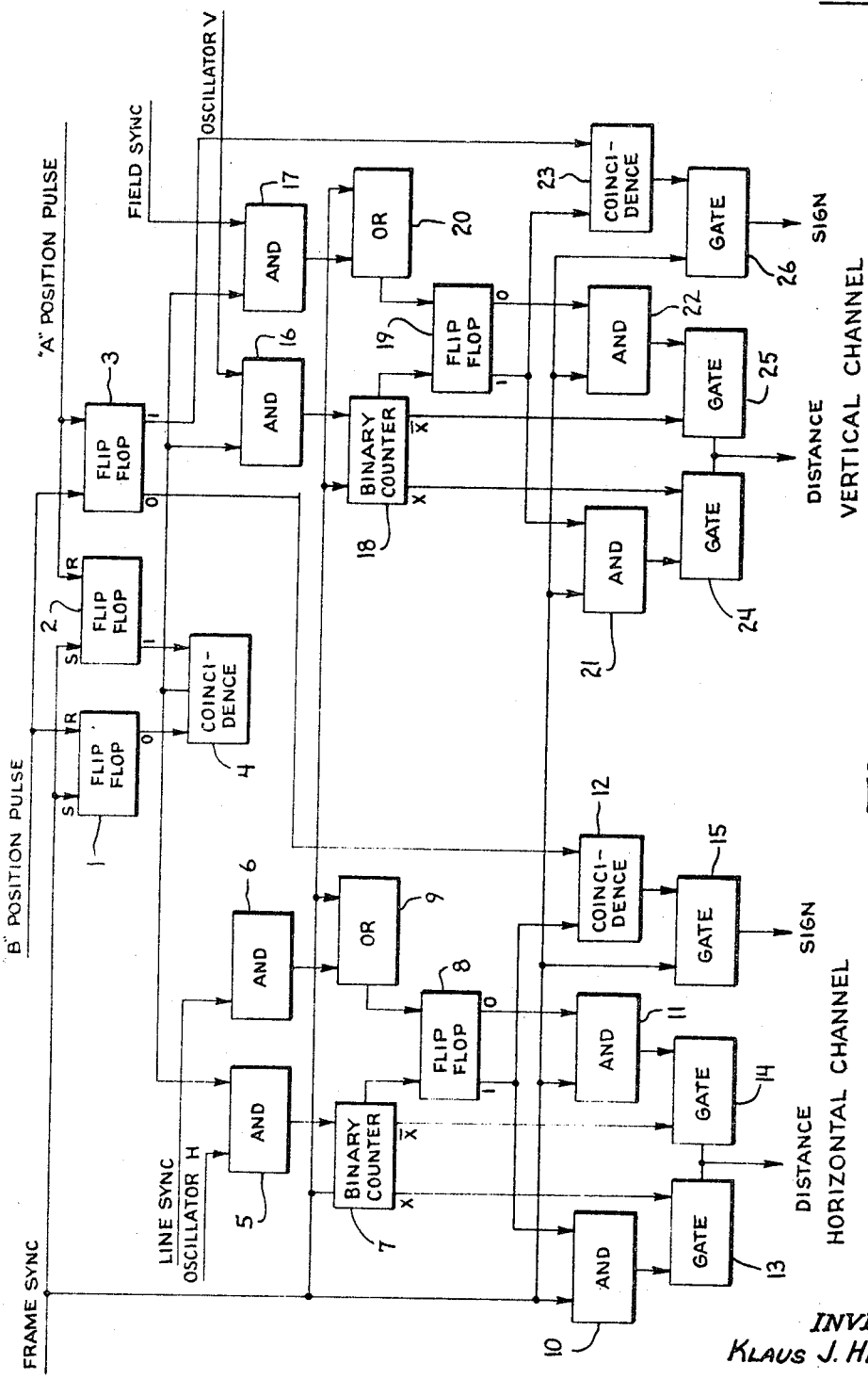
FIGURE 1 shows a complete block diagram of the invention which has four output signals to give the distance between, and relative position of the two points.

Referring to FIGURE 1 it is seen that the outputs from FLIP FLOPS 1 and 2 are the inputs to a COINCIDENCE circuit 4. The inputs to FLIP FLOP 1 are the system "frame sync pulse" and the "B" position pulse, while the inputs to FLIP FLOP 2 are the "frame sync pulse" and the "A" position pulse. Although flip flops normally have two outputs, only one output from each of FLIP FLOPS 1 and 2 is used. When the "frame sync pulse" comes along, both of these flip flops are set so that FLIP FLOP 1 has a ZERO output and FLIP FLOP 2 has a ONE. The "A" and "B" position pulses reset the two flip flops so that the output of FLIP FLOP 1 is a ONE and the output of FLIP FLOP 2 is a ZERO. When the "frame sync pulse" sets the two flip flops it is seen that coincidence does not occur at the COINCIDENCE circuit 4. Coincidence does occur however, when either an "A" or a "B" position pulse is received. If a "B" position pulse is received first then each input to the COINCIDENCE circuit 4 will be ONE; and, each input will be ZERO if the "A" position pulse is received first. When the inputs to the COINCIDENCE circuit 4 are alike, the circuit puts out a gate. Therefore, as soon as either position pulse is received, the COINCIDENCE circuit provides an output gate which lasts until the second position pulse is received by one of the flip flops, thereby ending the coincidence; or, in other words, the interval during which the COINCIDENCE circuit 4 is furnishing an output is equal to the time required for the beam to scan from the point at which one position pulse occurs to the point at which the second occurs. It is seen that the COINCIDENCE circuit 4 feeds two identical groups of circuitry; one channel for giving horizontal information, and one channel for giving vertical information. Specifically, BINARY COUNTER 7 and logic circuitry comprised of AND circuits 5, 6, 10, and 11, FLIP FLOP 8, COINCIDENCE circuit 12, OR circuit 9, GATES 13, 14, and 15, form the horizontal information path; and BINARY COUNTER 18 and logic circuitry comprised of AND circuits 16, 17, 21, and 22, FLIP FLOP 19, COINCIDENCE circuit 23, OR circuit 20, GATES 24, 25, and 26, form the vertical information path. The output of the COINCIDENCE circuit 4 serves as an input to AND circuits 5, 6, 16, and 17. All AND circuits in this invention have two inputs, and the second input to AND 5 is an oscillator signal. The frequency of the OSCILLATOR H (not shown) is sufficient to step BINARY COUNTER 7 to a count equal to the number of resolution intervals, in the time required for scanning a single scan line. Both BINARY COUNTERS 7 and 18, count from 1 to 511 and therefore there are 511 resolution intervals in this invention. AND 5 acts as an electronic switch and couples the OSCILLATOR H signal to BINARY COUNTER 7 during the time between the position pulses. BINARY COUNTER 7 has a second input which is the "frame sync pulse" and which resets the counter to 111111111, the binary equivalent of 511, thereby setting FLIP FLOP 8 as soon as the first signal is received from AND 5. The reset signal to FLIP FLOP 8 comes from OR 9 whose inputs are the "frame sync pulse" and the output of AND 6. AND 6 is fed by the "line sync pulse" and the output of COINCIDENCE circuit 4. When FLIP FLOP 8 is set, the ONE output is coupled as an input to AND 10 and COINCIDENCE circuit 12, while the ZERO output is coupled to AND 11. The "frame sync pulse" forms the second input to both AND 10 and AND 11. AND 10 opens GATE 13 so that it will pass the X signal, and GATE 14 is opened by AND 11 to pass the X̄ signal. The X signal is equal to the actual count in the binary counter, while X̄ is equal to 511 minus the actual count. The necessity of this function will be explained later in the specification. The output of GATES 13 and 14 are coupled together to form the horizontal distance signal. COINCIDENCE circuit 12 has as its second input, the "set" output of FLIP FLOP 3 which serves as a position selection circuit and which is set to ZERO by the "B" position pulse. The output of the COINCIDENCE circuit 12 is coupled as one input to GATE 15 which is opened by the "frame sync pulse." The output of GATE 15 furnishes the sign of the difference between points "A" and "B." That is, if "A" is to the right of "B" on the raster the sign will be a ZERO (positive) and if "A" is to the left of "B" on the raster the sign will be a ONE (negative).

The vertical channel is constructed in a manner to the horizontal channel with three exceptions; COINCIDENCE circuit 23 is coupled to the reset output of FLIP FLOP 3 which is a ONE when the circuit is "set"; AND 17 is fed by the "field sync signal" instead of the "line sync"; and, the frequency of OSCILLATOR V (not shown) is equal to the vertical sweep frequency times 511. Aside from these different inputs it is seen however, that the two channels are identical. GATE 26 is arranged to give a ZERO (positive) if "A" is above "B" and to give a ONE (negative) if "A" is below "B." At the end of each frame the output gates are opened and the distance and "sign" information is transferred.

Figure 2:
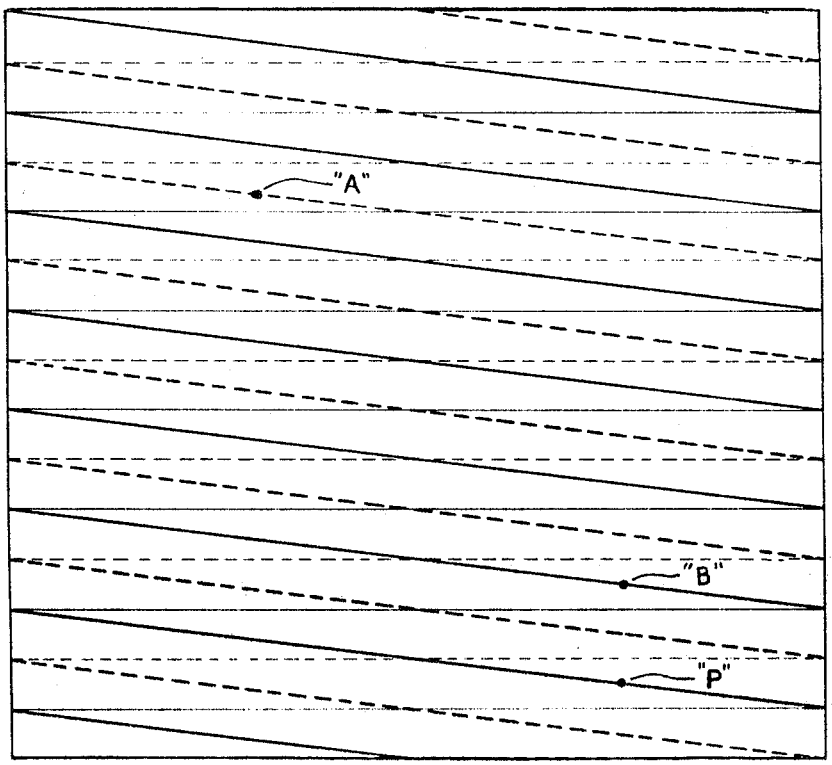
FIGURE 2 is a representation of a television raster showing an interlaced pattern of scans, where the heavy solid lines represent the first scan of the frame and the lighter solid lines represent retrace lines, and where the heavy dotted lines represent a subsequent scan in the same frame and the lighter dotted lines represent retrace lines.

FIGURE 2 pictorially illustrates how the counting is accomplished. Assume that the solid line, originating at the top left corner of the figure, is the horizontal sweep at the beginning of a frame. Point "B" will then furnish its position pulse first since it is on a horizontal line in the first interlace pattern; and, point "A" on the dotted line, will produce its position pulse at some later time since it falls on a horizontal sweep of a subsequent interlace pattern. Consider first the horizontal difference between "A" and "B." Since the OSCILLATOR H frequency, which steps the BINARY COUNTER 7, is equal to 511 times the line frequency, it can be seen that FIGURE 2 is effectively divided up into 511 intervals and the BINARY COUNTER 7 will count to 511 for each horizontal line. Therefore, the BINARY COUNTER 7 will start counting when the sweep passes point "B," and it will count up to 511 by the time the sweep reaches point "P," whereupon it will start over again, continuing this process, until point "A" is reached. From FIGURE 2 it is seen that the binary counter must selectively put out the X signal, which is the actual count, or the $\overline{X}$ signal, which is equal to 511 minus the actual count. This is accomplished by making $\overline{X}$ equal to the inverse of X.

The attractiveness for this system of binary counters, having a maximum count of 511, consists in part in the fact that it is possible to obtain the number 511 minus the accumulated count by simply inverting all bits of the accumulated count. A 9-bit binary counter starts its count at zero and counts up to 511, and resets when it has received 512 pulses. If the overflow pulse is fed back to the input, the counter will skip the position where all the bits are ZERO; that is, it will go directly from the position 111111111 to position 000000001. The ability of this counter to represent the desired 511-minus-accumulated-count by inversion of the accumulated count may be illustrated as follows: If the actual count is 101010101, then the inversion would be 010101010. The value of the actual binary number is 341; and, the value of the inverted binary number is 170; which is equal to 511 minus the actual value (511−341=170).

In FIGURE 2 it is seen that $\overline{X}$ would be the proper output since the BINARY COUNTER 7 started counting at "B" and the distance between "A" and "B" is 511 minus the actual count. In measuring the vertical distance between points "A" and "B" the OSCILLATOR V frequency is used. This frequency is equal to the vertical sweep frequency times 511, and the circuitry performs in a manner identical to the horizontal circuitry.

OPERATION

First the operation of the horizontal channel will be discussed. The "frame sync pulse" which signals the start of a new frame resets FLIP FLOPS 1 and 2, and BINARY COUNTERS 7 and 18. The BINARY COUNTERS are reset by the "frame sync pulse" to 111111111, the binary equivalent of 511, rather than to 000000000, so that FLIP FLOPS 8 and 19 will be set immediately after the counters begin counting. Upon the arrival of the first position pulse ("A" or "B") in that frame, COINCIDENCE circuit 4 delivers its ONE signal to AND's 5 and 6. The arrival of this pulse causes AND 5 to deliver the signal from OSCILLATOR H to BINARY COUNTER 7, and thus causes BINARY COUNTER 7 to begin to count at the rate determined by OSCILLATOR H. When BINARY COUNTER 7 has finished counting to 511, the scanning beam is at a point in the next scan line which is directly below the point at which the first position pulse occurred and at which BINARY COUNTER 7 began to count. At this point BINARY COUNTER 7 begins to repeat its counting procedure, and continues to repeat this procedure through succeeding scan lines until the arrival of the second position pulse. The arrival of that pulse terminates the ONE signal from COINCIDENCE circuit 4, thus causing AND 5 to stop delivering the signal from OSCILLATOR H to BINARY COUNTER 7, and thereby causing BINARY COUNTER 7 to stop counting.

Determination of which of the two values X or $\overline{X}$ is the appropriate one for the particular frame is performed through the use of AND 6, OR 9, FLIP FLOP 8, and AND's 10 and 11. The inputs to AND 6 are the output of COINCIDENCE circuit 4 and the "line sync pulse." Thus, throughout the duration of the ONE signal from COINCIDENCE circuit 4, AND 6 delivers an output which signifies when the beam has arrived at the end of one scanning line and is starting to scan the next line. This output is used via OR 9 to reset FLIP FLOP 8, causing it to deliver a ONE signal from its ZERO output to AND 11. The duration of this reset signal equals the time required for the scanning beam to move from the left edge of the raster to the vertical line at which the first position pulse occurred. When the beam reaches that line, the "overflow" output signal from BINARY COUNTER 7 sets FLIP FLOP 8, terminating its ONE signal to AND 11 and causing it to send a ONE signal from its ONE output to AND 10. FLIP FLOP 8 continues to send this ONE signal to AND 10 until the beam reaches the right edge of the raster, when a new "line sync pulse" resets FLIP FLOP 8 and causes it to begin again to deliver a ONE signal from its ZERO output to AND 11. FLIP FLOP 8 continues to deliver these alternating outputs to AND's 10 and 11 until the arrival of the second position pulse, which terminates the ONE signal from COINCIDENCE circuit 4 and thus terminates both the output from AND 5 to BINARY COUNTER 7 and the output from AND 6 via OR 9 to FLIP FLOP 8. At this instant, either AND 10 or AND 11 will be receiving an input from FLIP FLOP 8, and it will continue to receive this input until the arrival of the next "frame sync pulse," signaling the end of this particular frame. If the scanning beam was in the left part of the raster with respect to the first position pulse, when the second position pulse arrived, AND 11 will be receiving a ONE signal from the ZERO output of FLIP FLOP 8, and the "frame sync pulse" will cause AND 11 to deliver an output pulse which opens GATE 14 and allows the X output of BINARY COUNTER 7 to pass through as the horizontal distance or error signal. Conversely, if the scanning beam was in the right part of the raster with respect to the first position pulse, when the second position pulse arrives, AND 10 will be receiving a ONE signal from the ONE output of FLIP FLOP 8, and the "frame sync pulse" will cause AND 10 to deliver an output pulse which opens GATE 13 and allows the X output of BINARY COUNTER 7 to pass through as the H error signal.

It remains to determine the proper sign of the H error signal; that is, the direction of the deviation of the "A" position from the "B" position. This deviation is measured always in the "B" to "A" direction, and the signs are defined as positive in the upward and the right directions, and negative in the opposite directions (downward and to the left). Determination of the sign of the error signal in the H channel is performed by COINCIDENCE circuit 12 on the basis of inputs received from FLIP FLOPS 3 and 8. As noted previously, a ONE signal in the ONE output of FLIP FLOP 3 signifies that the "A" position pulse occurred first, and a ONE signal in the ZERO output of FLIP FLOP 3 signifies that the "B" position pulse occurred first. The ZERO output of FLIP FLOP 3 is fed to COINCIDENCE circuit 12, which also receives the ONE output of FLIP FLOP 8. The presence of ONE signals at the outputs of these flip flops signifies that (1) the "B" position pulse occurred first, and (2) the second position pulse occurred to the left of the first. The presence of ZERO signals at the outputs of both flip flops signifies that (1) the "A" position pulse occurred first, but that (2) the second pulse occurred to the left of the first. In either of these two cases (ONE signals from both the ZERO output of FLIP FLOP 3 and the ONE output of FLIP FLOP 8 or ZERO signals from both outputs), COINCIDENCE circuit 12 will deliver a ONE signal to GATE 15, and, when GATE 15 is opened by the "frame sync pulse" signifying the end of the particular frame, this output from COINCIDENCE circuit 12 will be delivered to the output terminals to signify that the sign of the H error which is simultaneously being delivered from GATE 1 or GATE 2 is negative.

The reception by COINCIDENCE circuit 12 of a ONE signal from FLIP FLOP 3 and a ZERO signal from FLIP FLOP 8 signifies that (1) the "B" position pulse occurred first, and (2) the second pulse occurred to the right of the first. Similarly, the reception by coincidence circuit 12 of a ZERO signal from FLIP FLOP 3 and a ONE signal from FLIP FLOP 8 signifies that (1) the "A" position pulse occurred first, but that (2) the second pulse occurred to the left of the first position pulse. In either of these cases, COINCIDENCE circuit 12 will deliver a ZERO signal to GATE 15; and, when GATE 15 is opened by the "frame sync pulse" signifying the end of the particular frame, a ZERO signal will be delivered to the output terminals. This ZERO signal signifies that the sign of the H error signal that is simultaneously being delivered by GATE 13 or GATE 14 is positive.

As indicated in FIGURE 1, the V error is determined in a manner similar to that employed in determining the H error, though it differs in certain respects due to the fact that each frame consists of several interlaced fields. In the V channel, the "field sync pulse" is used for a purpose analogous to that of the "line sync pulse" in the H channel. When BINARY COUNTER 18 has counted to 511, the scan will be at a point on the same horizontal line (not the same scanning line) as the point at which it started counting, and it will begin to repeat its counting procedure. If the second position pulse occurs when the scanning beam is at a point below that at which the first position pulse occurred, the count in BINARY COUNTER 18 will accurately define the distance between the "A" and "B" positions on the raster. If, on the other hand, the second position pulse occurs when the scanning beam is above the point at which the first position pulse occurred, then the horizontal distance between the "A" and "B" positions on the raster will be equal to 511 minus the count in BINARY COUNTER 18 at the time when the second position pulse occurs. Determination of the sign of the V error signal is performed by COINCIDENCE 23 in a manner analogous with that used in the H channel.

It will be understood that various changes in the details, which have been herein described and illustrated in order to explain the nature of the invention, may be made by those skilled in the art within the principle and scope of the invention and I desire to be limited only in the scope of the appended claims.

What is claimed is:
1. A device which, when coupled with a television system, accurately determines the horizontal and vertical distances, and relative positions, between two points on a television image by measuring the number of resolution intervals between the two points, wherein said television system produces a position pulse on an output for each of the two points when the beam sweeps by the point, comprising:
   a gating means having the capacity to provide a gating pulse output during the time the television beam is sweeping from one of said points to the other, said gating means having two inputs adapted to be coupled to said two position pulse outputs, respectively;
   a position selection circuit means having a first and a second output and having two inputs adapted to be coupled to said two position pulse outputs, respectively;
   a horizontal channel means having a first binary counting means, said binary counting means having two outputs and having an input coupled from a horizontal electronic switching means, said horizontal switching means having first and second inputs, said first horizontal switching means input being coupled to said gating means output, and said second horizontal switching means input being adapted for coupling to a first oscillator which provides a signal having a frequency equal to a multiple of the line frequency of the television system, wherein said multiple is equal to the number of said resolution intervals, and said horizontal channel means having a first logic circuit means for providing two horizontal outputs, one of which represents the horizontal distance between said points and the other of which represents the relative position between the points, said first logic circuit means having as inputs said first output of said position selection circuit means and said outputs of said first binary counting means; and
   a vertical channel means having a second binary counting means, said binary counting means having two outputs and having an input coupled from a vertical electronic switching means, said vertical switching means having first and second inputs, said first vertical switching means input being coupled to said gating means output, and said second vertical switching means input being adapted for coupling to a second oscillator which provides a signal having a frequency equal to a multiple of the field frequency of the television system, wherein said multiple is equal to the number of said resolution intervals, and said vertical channel means having a second logic circuit means for providing two vertical outputs, one of which represents the vertical distance between said points and the other of which is the relative position between the points, said second logic circuit means having as inputs said second output of said position selection circuit means and said outputs of said second binary counting means, whereby said electronic switching means gate said first and second oscillator frequencies through to said first and said second binary counting means causing said respective binary counting means to count the horizontal and vertical resolution intervals between said points on said television image.

2. A device which, when coupled with a television system accurately determines the horizontal and vertical distances, and relative positions, between two points on a television image as described in claim 1 wherein
   said position selection means circuit is comprised of a flip flop circuit, and wherein each of said electronic switching means are AND circuits, and wherein said gating means is comprised of a first flip flop circuit having an output coupled as a first input to a coincidence circuit means, said gating means having a second flip flop circuit having an output coupled as a second input to said coincidence circuit means, said first flip flop having the frame synchronization pulse of said television system and the position pulse of one of said points as inputs, said second flip flop having the frame synchronization pulse of said television system and the position pulse of the other of said points as inputs, said coincidence circuit means having an output which provides said gating pulse.

3. A device which, when coupled with a television system, accurately determines the horizontal and vertical distances, and relative positions, between two points on a television image, as described in claim 2 wherein
each of said binary counting means are nine digit counters which effectively divide said television image into 511 resolution intervals in both the horizontal and vertical directions, and said two outputs of each of said binary counting means provide the actual binary count and the inverse of the binary count, whereby said device accurately determines the distances between said points by digitally counting the resolution intervals between said two points and providing a binary number output.

4. A device which, when coupled with a television system, accurately determines the horizontal and vertical distances, and relative positions, between two points on a television image, as described in claim 1 wherein
each of said binary counting means are nine digit counters which effectively divide said television image into 511 resolution intervals in both the horizontal and vertical directions, and said two outputs of each of said binary counting means provide the actual binary count and the inverse of the binary count, whereby said device accurately determines the distances between said points by digitally counting the resolution intervals between said two points and providing a binary number output.

References Cited

UNITED STATES PATENTS 3,321,575  5/1967  Lewczyk.
3,328,793  6/1967  McLaughlin et al.

ROBERT L. GRIFFIN, *Primary Examiner.*

B. LEIBOWITZ, *Assistant Examiner.*